United States Patent [19]

Fritzsche

[11] Patent Number: 4,940,913
[45] Date of Patent: Jul. 10, 1990

[54] CORE FOR A DYNAMOELECTRIC MACHINE

[75] Inventor: Harold L. Fritzsche, Rapid City, S. Dak.

[73] Assignee: General Electric Company, Fort Wayne, Ind.

[21] Appl. No.: 325,211

[22] Filed: Mar. 17, 1989

Related U.S. Application Data

[60] Division of Ser. No. 220,800, Jul. 18, 1988, which is a division of Ser. No. 934,889, Nov. 25, 1986, Pat. No. 4,794,778, which is a continuation-in-part of Ser. No. 904,140, Sep. 4, 1986, Pat. No. 4,796,451, which is a division of Ser. No. 660,211, Oct. 12, 1984, Pat. No. 4,613,780.

[51] Int. Cl.$^5$ ............................................. H02K 1/00
[52] U.S. Cl. ...................................... 310/216; 310/42; 310/254; 310/261; 29/609
[58] Field of Search ............... 310/216, 217, 218, 42, 310/179, 180, 254, 259, 261, 264, 195; 336/213, 134; 29/596, 609

[56] References Cited

U.S. PATENT DOCUMENTS

| | | | |
|---|---|---|---|
| Re. 26,788 | 2/1970 | Hull | 310/42 |
| 356,902 | 2/1887 | Thompson | 310/264 |
| 1,623,768 | 4/1927 | Way . | |
| 1,920,155 | 7/1933 | Fisher . | |
| 1,920,354 | 8/1933 | Carpenter | 171/252 |
| 2,493,414 | 1/1950 | Morrison | 310/42 UX |
| 3,095,774 | 7/1963 | Hart | 83/37 |
| 3,122,667 | 2/1964 | Baciu | 310/259 |
| 3,202,851 | 8/1965 | Zimmerle | 310/259 |
| 3,243,623 | 3/1966 | Hart | 310/216 |
| 3,283,399 | 11/1966 | Hart et al. | 29/598 |
| 3,577,851 | 5/1971 | Detheridge | 310/216 |
| 3,597,835 | 8/1971 | Scaillet | 310/42 |
| 3,606,674 | 9/1971 | Givan | 29/596 |
| 3,650,022 | 3/1972 | Stone | 310/42 |
| 3,708,706 | 1/1973 | Akiyama et al. | 310/216 |
| 3,842,300 | 10/1974 | Daykin | 310/261 |
| 3,886,256 | 5/1975 | Ohuchi | 310/216 |
| 4,102,040 | 7/1978 | Rich | 310/216 |
| 4,116,033 | 9/1978 | Iwaki et al. | 29/596 |
| 4,193,281 | 3/1980 | Kulikow | 29/596 |
| 4,202,196 | 5/1985 | Asai et al. | 29/596 |
| 4,206,624 | 6/1980 | Asai et al. | 72/131 |
| 4,395,815 | 8/1983 | Stanley | 310/216 |
| 4,423,343 | 12/1983 | Field, II | 310/216 |
| 4,613,780 | 9/1986 | Fritzsche | 310/42 |
| 4,644,775 | 2/1987 | Fuchs, Jr. | 72/402 |
| 4,649,731 | 3/1987 | Eisenmann | 72/402 |
| 4,653,162 | 3/1987 | Ferguson et al. | 72/402 |
| 4,677,834 | 7/1987 | Retallick | 72/402 |
| 4,745,675 | 5/1988 | Marks et al. | 29/596 |
| 4,794,778 | 1/1989 | Fritzsche | 72/354 |
| 4,796,451 | 1/1989 | Fritzsche | 29/605 |

FOREIGN PATENT DOCUMENTS

| | | | |
|---|---|---|---|
| 0917626 | 9/1954 | Fed. Rep. of Germany | 310/217 |
| 0139329 | 12/1979 | German Democratic Rep. | 310/216 |
| 0116033 | 7/1983 | Japan | 310/216 |
| 0500559 | 5/1987 | Japan . | |
| 0002501 | 4/1986 | PCT Int'l Appl. . | |
| 0773837 | 10/1980 | U.S.S.R. | 310/42 |
| 2005486 | 4/1979 | United Kingdom | 310/216 |

*Primary Examiner*—R. Skudy
*Attorney, Agent, or Firm*—Ralph E. Krisher, Jr.

[57] ABSTRACT

A core for a dynamoelectric machine has a stack of generally thin ferromagnetic material. The stack includes a pair of opposite end faces, a pair of generally radially spaced apart circumferential surfaces interposed between the opposite end faces, and a deformed circumferential section between the opposite end faces and at least generally adjacent one of the circumferential surfaces and defining a generally annular beveled surface on at least one of the opposite end faces.

26 Claims, 10 Drawing Sheets

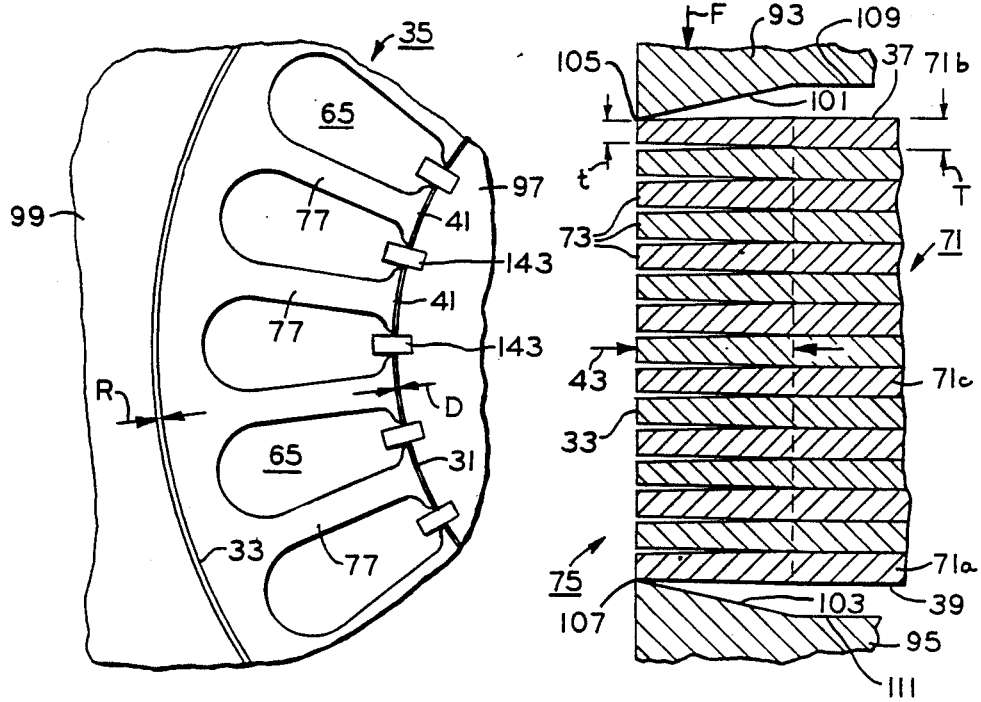
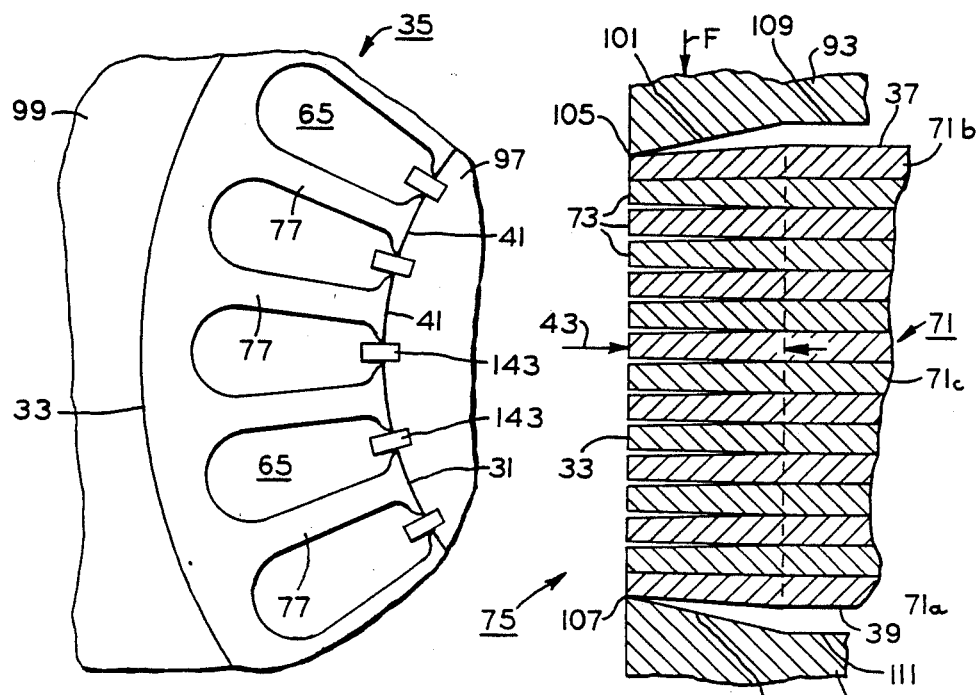

CORE FOR A DYNAMOELECTRIC MACHINE

CROSS-REFERENCE TO RELATED APPLICATION

This application is a division of the commonly assigned copending application Ser. No. 220,800 filed July 18, 1988 which is a division of the commonly assigned then copending application Ser. No. 934,889 filed Nov. 25, 1986 (now U.S. Pat. No. 4,794,778 issued Jan. 3, 1989) which, in turn, is a continuation-in-part of the commonly assigned Harold L. Fritzsche application Ser. No. 904,140 filed Sept. 4, 1986 (now U.S. Pat. No. 4,796,451 issued Jan. 10, 1989) which is a division of the commonly assigned application Ser. No. 660,211 filed Oct. 12, 1984, (now U.S. Pat. No. 4,613,780 issued Sept. 23, 1986) and such applications Ser. Nos. 220,800, 934,889, 904,140 and 660,211 are incorporated herein by reference.

FIELD OF THE INVENTION

This invention relates in general to dynamoelectric machines and in particular to an edgewise wound core adapted for use in a dynamoelectric machine.

BACKGROUND OF THE INVENTION

In the past various schemes have been employed to fabricate and size a core for a dynamoelectric machine, and such cores have been both of the edgewise wound type and the interfacing individual lamination type. Common to the edgewise wound and lamination type core was that each had a pair of opposite end faces interconnected between inner and outer circumferential surfaces. A yoke of these past cores was bounded by the outer circumferential surface thereof, and a plurality of tooth rows interposed between the opposite end faces extended on preselected pitch axes from the yoke with the tips of the teeth, or tooth tip rows, defining the inner circumferential surface or bore of the past cores.

In one of the past core sizing schemes, the bore of the core was burnished thereby to remove burrs or the like which may have been present on the inner circumferential edges of at least some of the laminations comprising such bore, and it is believed that such a burnishing operation may have had some sizing effect on the bore of the core. However, at least one disadvantageous or undesirable feature of the aforementioned burnishing operation is believed to be that it sized only the inner circumferential surface of the core.

In another of the past core sizing schemes, a cylindric sizing rod or arbor was forced into sizing engagement with the bore of the past edgewise wound core, and since the diameter of the sizing arbor was predeterminately greater than that of the bore, both the bore and the outer circumferential surface of the core were expanded generally radially outwardly thereof. During the sizing engagement of the sizing arbor with the bore of the core, the opposite end faces of the core were compressed in sizing engagement between a pair of die surfaces on a pair of opposed dies with the die surfaces engaging the opposite end faces in their entireties, respectively. One of the disadvantageous or undesirable features of this past core sizing scheme is believed to be that the compressive force exerted by the die surfaces onto the tooth rows of the core between the opposite end faces thereof may have been of such magnitude as to have had the tendency to angularly displace the individual teeth in the tooth rows with respect to each other. At least another disadvantageous or undesirable feature of this past core sizing scheme is believed to be that the outer circumferential surface was not sized upon the expansion thereof generally radially outwardly of the core. Still another disadvantageous or undesirable feature of this past core sizing scheme is believed to be that the yoke section of such past core may have deflected axially in response to the sizing engagement of the sizing arbor with the bore of such past core resulting in core laminations having a generally curved geometry and not suitable for farther manufacturing.

In still another of the past core sizing scheme, another sizing arbor similar to that discussed above was forced into sizing engagement with the bore of the past lamination type core, and since the diameter of the sizing arbor was greater than that of the bore, both the bore and the outer circumferential surface of the core were expanded generally radially outwardly thereof, but only portions of the outer circumferential surface of the core adjacent the opposite end faces thereof were expanded into sizing engagement with a pair of sizing rings therefor. Upon the sizing engagement of the sizing arbor with the bore of the core, the opposite end faces of the core were compressed in sizing engagement between a pair of die surfaces on a pair of opposed dies with the die surfaces engaging the opposite end faces in their entirety, respectively. Further, the die faces were provided with a pair of opposed ring-shaped platforms which formed opposite annular recesses in the opposite end faces of the core adjacent the aforementioned sized portions of the outer circumferential surface thereof, respectively. One of the disadvantageous or undesirable features of this past core sizing scheme is believed to be that the compressive force exerted by the die surfaces onto the tooth rows of the core between the opposite end faces thereof may have been of such magnitude as to have had the tendency to angularly displace the individual teeth in the tooth rows with respect to each other. At least another disadvantageous or undesirable feature of this past core sizing scheme is believed to be that only a portion of the outer circumferential surface of the core was sized. And still another disadvantageous or undesirable feature of this past core sizing scheme is believed to be that the yoke section of such past core may have deflected axially in response to the sizing engagement of the sizing arbor with the bore of such past core resulting in core laminations having a generally curved geometry and not usable for farther manufacturing.

With respect to the past edgewise wound cores, one of the problems encountered during the fabrication of such edgewise wound cores involved "spring-back" of a lanced strip of ferromagnetic material edgewise wound into a plurality of helical convolutions arranged in an annular stack thereby to comprise the edgewise wound core. For instance, the lanced strip was edgewise deformed through a predetermined radius into the helical convolutions thereof defining the core; however, in response to such edgewise deformation, the helical convolutions tended to "spring-back", i.e., tended to assume a greater radius than the predetermined radius through which the lanced strip was edgewise deformed into such helical convolutions thereof. To further complicate the above discussed "spring-back" problem, lanced strips from different stock rolls of the ferromagnetic material are believed to have exhibited different degrees of "spring-back"; therefore, each time lanced strips from such different stock rolls were formed into edgewise wound cores, it is believed that the winding apparatus therefor was shut down and set up, i.e., readjusted, to predeterminately control the different "spring-back" of such lanced strips from such different stock rolls thereof. Thus, it would be desirable to, in effect, be able to ignore the "spring-back" characteristics of the various lanced strips upon the edgewise winding thereof into edgewise wound cores, and then size both the inner and outer circumferential surfaces of such core to preselected diameters therefor.

SUMMARY OF THE INVENTION

Among the several objects of the present invention may be noted the provision of an improved edgewise wound core which at least in part overcomes the above discussed disadvantageous or undesirable features, as well as others, of the prior art; the provision of such improved core in which an outer circumferential surface and a plurality of tooth tip rows comprising an inner circumferential surface of the core aligned between a pair of opposite end faces thereof are sized in their entireties to preselected diameters therefor, respectively; the provision of such improved core in which the outer circumferential surface and tooth tip rows are deformed generally in opposite radial directions with respect to the core so as to be predeterminately sized with the preselected diameters therefor; the provision of such improved core wherein a lanced strip of ferromagnetic material is edgewise wound into a plurality of helical convolutions comprising the core with the helical convolutions each having a tapered edge part defining the outer circumferential surface on the core and wherein at least some of the tapered edge parts are deformed generally axially across the core thereby to abut together axially adjacent ones of the tapered edge parts, respectively; the provision of such improved core in which the abutment of the tapered parts on the helical convolutions of the core is effective to provide a greater core density; the provision of such improved core having a beveled surface on the at least one opposite end face of the core intersecting with the outer circumferential surface thereof; and the provision of such improved core in which the components utilized therein are simple in design, easily assembled and economically manufactured. These as well as other objects and advantageous features of the present invention will be in part apparent and in part pointed out hereinafter.

In general and in one form of the invention, a core for a dynamoelectric machine is provided with a stack of generally thin ferromagnetic material. The stack includes a pair of generally opposite end faces, and a pair of generally radially spaced apart circumferential surfaces on the stack are interposed between the opposite end faces thereof, respectively. A generally annular deformed section is provided on the stack between the opposite end faces and at least generally adjacent one of the circumferential surfaces thereby to define a generally annular beveled surface on at least one of the opposite faces at least generally adjacent the one circumferential surface.

BRIEF DESCRIPTION OF THE DRAWINGS

FIG. 9 is an enlarged partial view taken from FIG. 8 and illustrating the predetermined spaced apart relation of the sizing means with an inner circumferential surface and an outer circumferential surface of the core prior to the sizing thereof;

FIG. 10 is generally the same as FIG. 9 but showing the sizing engagement of the circumferential surfaces of the core with the sizing means;

FIGS. 11, 12, 13 and 14 are enlarged partial sectional views showing the progressive deformation and abutment together of a tapered edge portion on a plurality of helical convolutions of the edgewise wound lanced strip between the opposed die means thereby to form an edgewise wound core in one form of the invention and illustrating principles which may be practiced in a method of sizing a core, respectively;

Corresponding reference characters refer to corresponding parts throughout the several views of the drawings.

Figure 1:
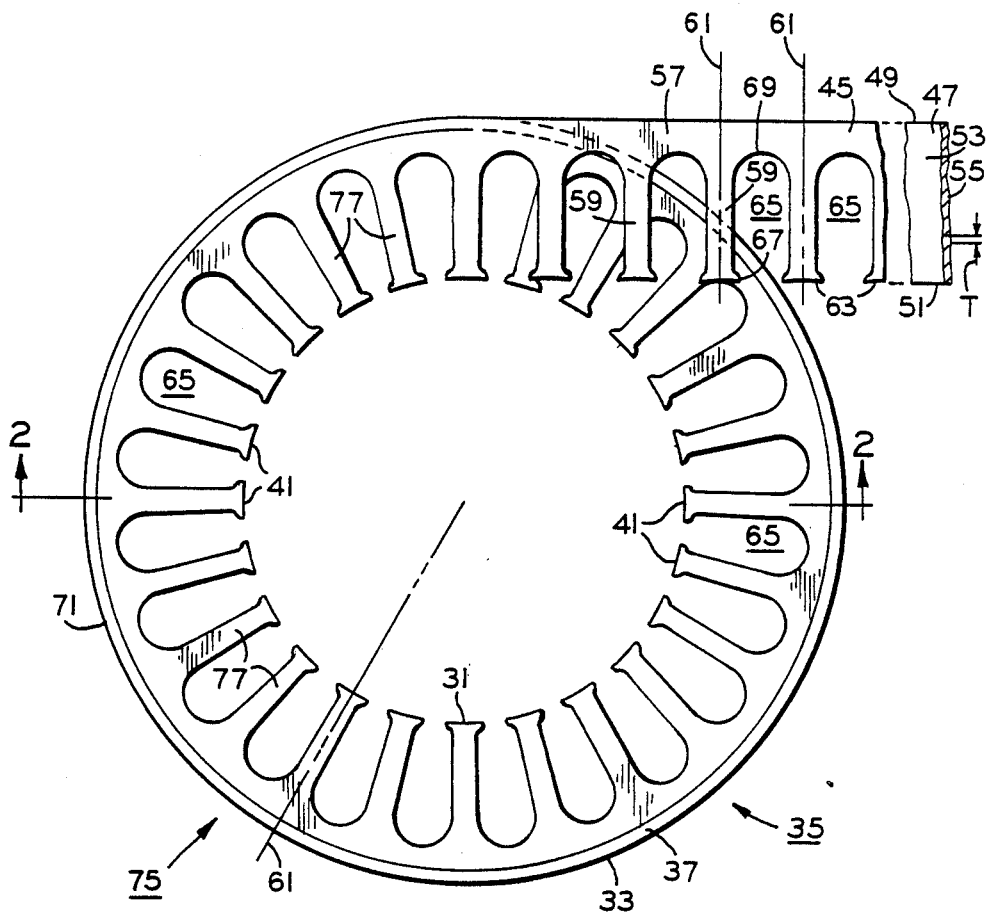
FIG. 1 is a plan view illustrating the edgewise winding of a lanced strip of generally thin ferromagnetic material into an edgewise wound core and with the component parts of the lanced strip aligned generally axially across the core.

The exemplifications set out herein illustrate the preferred embodiments of the invention in one form thereof, and such exemplifications are not to be construed as limiting either the scope of the disclosure or the scope of the invention in any manner.

DETAILED DESCRIPTION OF THE PREFERRED EMBODIMENTS

With reference now to the drawings in general, there is shown a method for predeterminately sizing an inner circumferential surface 31 and an outer circumferential surface 33 of a core 35 having a pair of generally opposite end faces 37, 39 respectively interposed between the inner and outer circumferential surfaces and with a plurality of tooth tip rows 41 on the core comprising at least in part the inner circumferential surface thereof (FIGS. 1–19). In practicing this method, only a circumferential or annular section or portion 43 of core 35 is compressed generally axially thereacross, and the circumferential section is defined between opposite end faces 37, 39 of the core at least generally adjacent outer circumferential surface 33 thereof (FIGS. 11–14). Outer circumferential surface 33 and tooth tip rows 41 of core 35 are displaced, expanded or otherwise deformed in generally radially opposite directions with respect to the core in response to the compression of only circumferential section 43 of the core, and such radial displacement of the outer circumferential surface and the tooth tip rows is positively limited or contained thereby to effect the predetermined sizing of inner and outer circumferential surfaces 31, 33, respectively (FIGS. 9 and 10).

Figure 2:
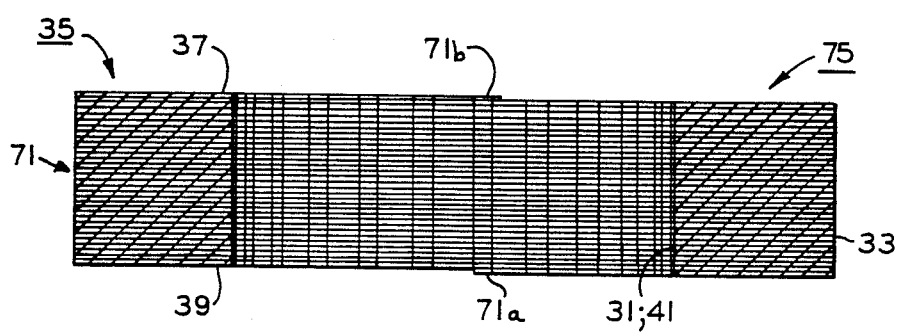
FIG. 2 is a sectional view taken along line 2—2 in FIG. 1.

More particularly and with specific reference to FIGS. 1 and 2, a strip 45 may be lanced or otherwise formed from a strip stock 47 of generally thin ferromagnetic material by suitable means well known to the art, such as a progressive die set or the like for instance (not shown), and the strip stock has, of course, the desired electrical and magnetic characteristics and the desired physical properties to enhance the edgewise winding of the lanced strip into core 35, as discussed in greater detail hereinafter. If a more detailed discussion is desired with respect to the lancing of strip stock 47 and/or a multiple or progressive die set to effect such lancing, reference may be had to the aforementioned Harold L. Fritzsche application Ser. No. 660,211. A pair of generally opposite edges 49, 51 are interposed between a pair of generally flat opposite surfaces or faces 53, 55 on strip 45 so as to extend generally along the length thereof, and the strip is provided with a generally constant thickness T along the length of the strip between the opposite faces thereof. When strip stock 47 is formed or lanced into strip 45, a yoke 57 extends generally lengthwise thereof along or at least generally adjacent opposite edge 49 of the strip. A plurality of teeth 59 on strip 45 extend on a plurality of preselected pitch axes 61 generally laterally from yoke 57 toward opposite edge 51 of the strip, and a plurality of tips or tip sections 63 define free ends on the teeth at least generally adjacent opposite edge 51 of the strip. A plurality of slots 65 intersecting with opposite faces 53, 55 of strip 45 are provided between adjacent ones of teeth 59, and the slots each have an open end or end portion 67 intersecting with opposite edge 51 of the strip between adjacent ones of the tooth tips and a close end or end portion 69 generally adjacent yoke 57 opposite the open end. While strip 45, its yoke 57, teeth 59, and slots 65 are illustrated herein for the purpose of disclosure, it is contemplated that other strips having yokes, teeth and slots of various different configurations may be utilized within the scope of the invention so as to meet at least some of the objects thereof.

To fabricate edgewise wound core 35 from strip 45, the strip is generally edgewise deformed or bent into a plurality of generally helical convolutions 71 thereof, and during such edgewise deformation of the strip, each opposite edge 49, 51 thereof is formed with a preselected radius. However, subsequent to the edgewise deformation of the strip, "spring back" occurs due to the resilient physical properties of the strip, and the deformed opposite edges on helical convolutions 71 thereby assume another or an as wound radius greater than the aforementioned preselected radius, respectively. In this practice of the sizing method of this invention, if a more detailed discussion of the edgewise deformation of strip 45 into helical convolutions 71 thereof and/or the "spring-back" of the helical convolutions is desired, reference may be had to the aforementioned application Ser. No. 660,211.

Further, when strip 45 is deformed into helical convolutions 71 thereof, a generally tapered section or part 73 is formed or deformed along opposite edge 49 on the helical convolutions, and the tapered edge part has an average thickness t which is less than the original or preselected thickness T of the strip, i.e., less than the thickness T of the strip between the tapered part and the other opposite edge 51 of the strip, as best seen in FIG. 11 and as well known in the art. Of course, the edgewise deformation of strip 45 imparting the aforementioned preselected radius to opposite edges 49, 51 of the strip, causes the strip to stretch along opposite edge 49 thereof thereby to result in the formation of tapered part 73 along opposite edge 49 on helical convolution 71.

Upon the above discussed formation of helical convolutions 71, the helical convolutions are arranged or accumulated in a generally annular and axially extending stack 75 thereof comprising core 35 as best seen in FIGS. 1 and 2. During the accumulation of helical convolutions 71 into stack 75, the component parts on the helical convolutions may be somewhat angularly displaced from each other (not shown); however, such component parts are readily and easily adjusted or repositioned with respect to each other thereby to effect the alignment of such component parts generally axially across the stack between opposite end faces 37, 39 thereon, respectively, as discussed in detail hereinafter. It is contemplated that the component parts on helical convolutions 71 may be aligned to extend generally axially between opposite end face 37, 39 of stack 75 either during or subsequent to the accumulation of the helical convolutions into the stack thereof within the scope of the invention so as to meet at least some of the objects thereof. Thus, when helical convolutions 71 are accumulated with the components parts thereof readjusted in aligned relation across stack 75, yoke 57 on the helical convolutions extends generally axially across the stack between opposite end faces 37, 39 thereby to define a yoke section of the stack, and tapered section 73 on each helical convolution is disposed so as to extend generally axially across the stack between the opposite end faces thereby to define outer circumferential surface 33 of the stack, as best seen in FIGS. 11-14. Further, teeth 59 are aligned generally in a plurality of rows or row formations 77 thereof generally axially across stack 75 between opposite end faces 37, 39, and the tooth rows extend on pitch axes 61 thereof generally radially inwardly from the yoke section of the stack with tooth tip rows 41 defining in part inner circumferential surface 31 of the stack. Of course, tapered parts 73 on helical convolutions 71 in stack 75 comprise the aforementioned circumferential section 43. Upon the edgewise winding of core 35, outer circumferential surface 33 which defines the outside diameter of the core is slightly smaller than the final or predetermined sized diameter thereof, and tooth tip rows 44 which define in part the inside diameter of the core is slightly larger than the final or predetermined sized diameter thereof, as further discussed hereinafter.

To effect the sizing of stack 75, only tapered part 73 on leading helical convolution 71a in stack 75 is supported, as best seen in FIGS. 11-14, and an external force F is exerted or applied against only the tapered part of trailing helical convolution 71b at opposite end face 37 of the stack. Upon the exertion of force F only on tapered part 73 of trailing helical convolution 71b, it may be noted that tapered parts 73 on at least some of helical convolutions 71 are successively deformed generally axially across the core with such successive deformation progressing from the tapered parts on leading and trailing helical convolutions 71a, 71b generally axially inwardly of the stack. In response to this axial deformation, it may also be noted that axially adjacent ones of tapered parts 73 on axially adjacent ones of helical convolutions 71 in stack 75 are abutted together in engagement generally axially across the stack, and upon the abutment of the axially adjacent tapered parts, it may be further noted that only the abutted together tapered parts on the helical convolutions are compressed together in response to the exertion of force F on only the tapered part of trailing helical convolution 71b when only the tapered part of leading helical convolution 71a is supported. Of course, in the event there is an odd or uneven number of helical convolutions 71 in stack 75, an intermediate helical convolution 71c is generally equidistantly axially spaced between leading and trailing helical convolutions 71a, 71b, and tapered part 73 on intermediate helical convolution 71c will remain generally axially undeformed; however, the tapered parts on the helical convolutions axially adjacent the intermediate helical convolution will be deformed into engagement with the undeformed tapered part on the intermediate helical convolution. Upon the aforementioned axial deformation of tapered parts 73 into abutment, it may be noted that when only tapered parts 73 of helical convolutions 71 in stack 75 are compressed together in response to force F, as discussed above, a pair of generally opposite annular beveled surfaces 79, 81 are defined on the tapered parts of leading and trailing helical convolutions 71a, 71b at opposite end faces 37, 39 of the stack at least generally adjacent outer circumferential surface 33 thereof. While force F is discussed herein as effecting the deformation and compression of only tapered parts 73 of helical convolutions 71 in stack 75 when only the tapered part of leading helical convolution 71 is supported for purposes of disclosure, it is contemplated that generally equal and opposite forces may be applied against only the tapered parts of leading and trailing helical convolutions 71a, 71b thereby to effect the compression together of only the tapered parts of the helical convolutions generally axially across the stack.

Upon the compression of the axially abutted together tapered parts 73 on helical convolutions 71 of stack 75, it may be noted that the magnitude of force F is at least great enough to effect a plastic flow beyond the elastic limits of the ferromagnetic material only in yoke 57 of each helical convolution in the stack. Thus, the force F is distributed at least generally equally in each helical convolution 71 of stack 75, and the aforementioned plastic flow only in yoke 57 of the helical convolutions is effective not only to predeterminately size core 35 but also to compensate for the "spring-back" occasioned when the core is wound, as further discussed hereinafter. At least upon the compression of circumferential section 43 in stack 75 by force F, a containment force Fc is also applied across the opposite end faces 37, 39 of the stack on at least tooth rows 77. It may also be noted that the magnitude of containment force Fc is preferably great enough to prevent the buckling of teeth 59, i.e., the spreading apart thereof in the axial direction across stack 75, but not great enough to effect deleterious radial or angular displacement of the teeth from tooth rows 77 thereof toward slots 65 or axial compression of the stack at the tooth rows in the same manner as previously mentioned with respect to the axial compression of circumferential section 43 of the stack by force F.

In response to the above discussed plastic flow of the ferromagnetic material in only yoke 57 of the helical convolutions 71 upon the compression generally axially across stack 75 of only the abutted together tapered parts 73 on the helical convolutions, it may be noted that outer circumferential surface 33 and tooth tip rows 41 on the stack are displaced or expanded generally in radially opposite directions with respect to the stack, and the generally radially opposite displacement of the outer circumferential surface and the tooth tip rows are positively and predeterminately limited or contained thereby to effect the predetermined sizing of both inner and outer circumferential surfaces 31, 33 of the stack, respectively, as best seen in FIGS. 9 and 10. Thus, it may also be noted that the aforementioned "spring-back" of helical convolutions 71 effected upon the edgewise winding of strip 45 may be compensated by the aforementioned plastic flow only in yoke 57 of the helical convolutions resulting in the generally radial opposite displacement of inner and outer circumferential surfaces 31, 33 to effect the sizing thereof, respectively. Additionally, it may be noted that the compression or abutting together of tapered parts 73 in core 35 is effective to provide a greater core density. Furthermore, albeit not shown for purposes of brevity of disclosure and drawing simplification, it is contemplated that a stack of individual laminations arranged generally in surface-to-surface engagement may have only a circumferential section thereof compressed together thereby to effect the radially opposite displacement and sizing of inner and outer circumferential surfaces on the lamination stack generally in the same manner as discussed hereinabove with respect to helical convolution stack 75 within the scope of the invention so as to meet at least some of the objects thereof.

An alternative core sizing method is illustrated in FIGS. 15-18 with the alternative method having generally the same method steps and utilizing generally the same component parts as disclosed hereinabove with respect to the previously described core sizing method.

In practicing this alternative core sizing method, leading helical convolution 71a in stack 75 is supported with the exception of tapered part 73 on the leading helical convolution which is unsupported. Force F is exerted against only tapered part 73 on trailing helical convolution 71b in stack 75, and in response thereto, it may be noted that only the tapered parts of the helical convolutions are successively deformed generally axially across the stack with such successive deformation progressing from the tapered part on the trailing helical convolution toward the tapered part on leading helical convolution 71a. Thus, upon the successive deformations generally axially across stack 75 of only tapered parts 73 on helical convolutions 71, it may be noted that axially adjacent ones of the tapered parts are deformed so as to abut in engagement with each other, and upon the deformation of the tapered part on leading helical convolution 71a, the entire leading helical convolution becomes supported. With the entire leading helical convolution 71a so supported, force F acting on only tapered part 73 on trailing helical convolution 71b in stack 75 serves to compress the abutted together tapered parts on helical convolutions 71 thereby to effect the previously mentioned plastic flow in only yoke 57 thereof and the resulting generally radially opposite displacements of outer circumferential surface 33 and tooth tip rows 41 of the stack. This radially opposite displacement of outer circumferential surface 33 and tooth tip rows 41 is positively or predeterminately limited or contained thereby to effect the predetermined sizing of both inner and outer circumferential surfaces 31, 33 on stack 75. To complete the description of the alternative core sizing method, it may be noted that only beveled surface 79 is formed on deformed tapered part on trailing helical convolution 71b in stack 75 at opposite end face 37 thereof, and the deformed tapered part on leading helical convolution 71a provides opposite end face 39 of the stack with a generally planar configuration.

Figure 19:
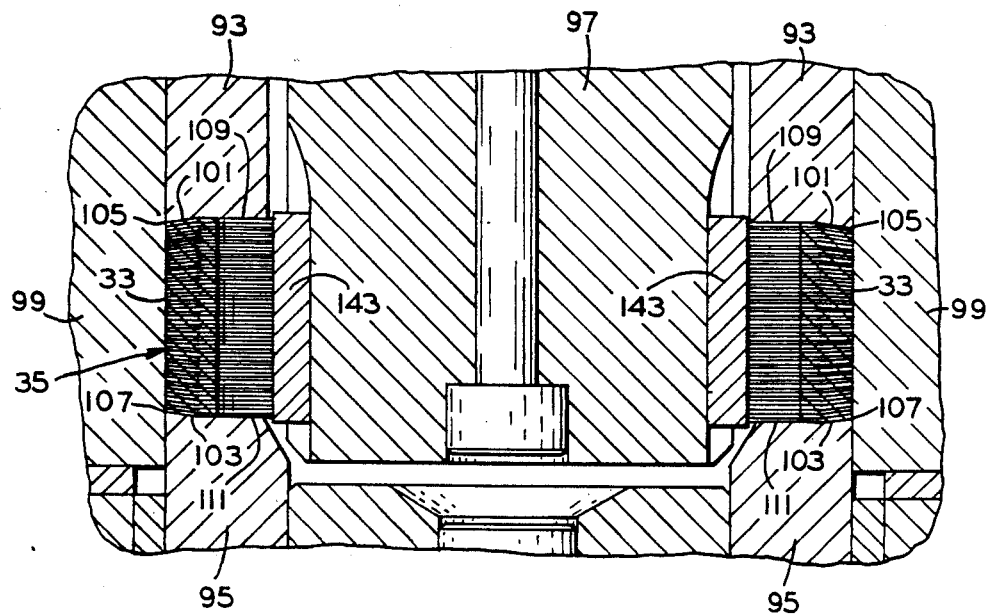
FIG. 19 shows the core of FIGS. 11–14 associated with the die means and sizing means upon the sizing of the core.

Referring again to the drawings in general and recapitulating at least in part with respect to the foregoing, edgewise wound core 35 in one form of the invention is provided with lanced strip 45 having opposite edges 49, 51 and edgewise wound into helical convolutions 71 arranged in stack 75 thereof. (FIGS. 1, 2 and 19). Stack 75 includes opposite end faces 37, 39 defined by leading and trailing helical convolutions 71a, 71b, and tapered part 73 is provided at least generally adjacent opposite edge 49 on each of helical convolutions 71 in the stack (FIGS. 2 and 11-14). Tapered parts 73 on at least some of helical convolutions 71 are deformed generally axially across stack 75 between opposite end faces 37, 39 thereof so as to at least in part abut together the tapered parts on axially adjacent ones of the helical convolutions in the stack, and the abutted together tapered parts comprise outer circumferential surface 33 on the stack interposed between opposite end faces 37, 39 thereof, respectively (FIG. 19).

A method is provided for operating an apparatus 91 to predeterminately size core 35 (FIGS. 3-10). Core 35 includes lanced strip 45 having opposite edges 49, 51 and edgewise wound into helical convolutions 71 arranged in stack 75, and the opposite edges on the helical convolutions define inner and outer circumferential surfaces 31, 33 of the core interposed between opposite end faces 37, 39 thereof with the inner circumferential surface comprising tooth tip rows 41 aligned between the opposite end faces, respectively (FIGS. 1, 2 and 19). Apparatus 91 includes a pair of generally opposed dies or die means 93, 95 operable generally for relative movement, and a plurality of sizing means, such as a sizing arbor 97 and a set of sector or sizing jaws 99 or the like for instance, operable generally for disposition in generally concentric spaced apart relation, respectively (FIGS. 5-10). In the practice of this method, sizing arbor and jaws 97, 99 are operated, and thereby the disposition of the sizing arbor and jaws in predetermined radially spaced apart relation with outer circumferential surface 33 and tooth tip rows 41 of core 35 is effected (FIGS. 5-10). Opposed dies 93, 95 are operated, and only circumferential section 43 of core 35 is compressed at least generally axially between the dies (FIGS. 5-7 and 11-14). In response to the compression of only circumferential section 43 of core 35, outer circumferential surface 33 and tooth tip rows 41 of the core are displaced into sizing engagement with sizing arbor and jaws 97, 99, and thereby both inner and outer circumferential surfaces 31, 33 of the core are predeterminately sized, respectively (FIGS. 9-12).

More particularly and with specific reference to FIGS. 7-16, opposed dies 93, 95 include a pair of opposed and generally annular beveled die surfaces 101, 103 with a pair of generally circular leading edges 105, 107 on the beveled die surfaces, respectively, as best seen in FIG. 11. To initiate the operation of apparatus 91, stack 75 of helical convolutions 71 is arranged or associated in a preselected located position on die 95, and in such preselected located position, tapered part 73 on leading helical convolution 71a at least generally adjacent outer circumferential surface 33 of the stack is placed in engagement with leading edge 107 of beveled die surface 103 on die 95. With stack 75 in its preselected located position on die 95, die 93 is moved relative to die 95, and upon such relative movement, leading edge 105 of beveled die surface 101 on die 93 is engaged with tapered part 73 on trailing helical convolution 71b at least generally adjacent outer circumferential surface 33 of the stack. Thus, stack 75 is contained in its preselected located position between opposed dies 93, 95, and it may be noted that beveled die surfaces 101, 103 on the opposed dies are disposed generally in overlaying relation with tapered parts 73 of leading and trailing helical convolutions 71a, 71b in stack 75, respectively.

Figure 6:
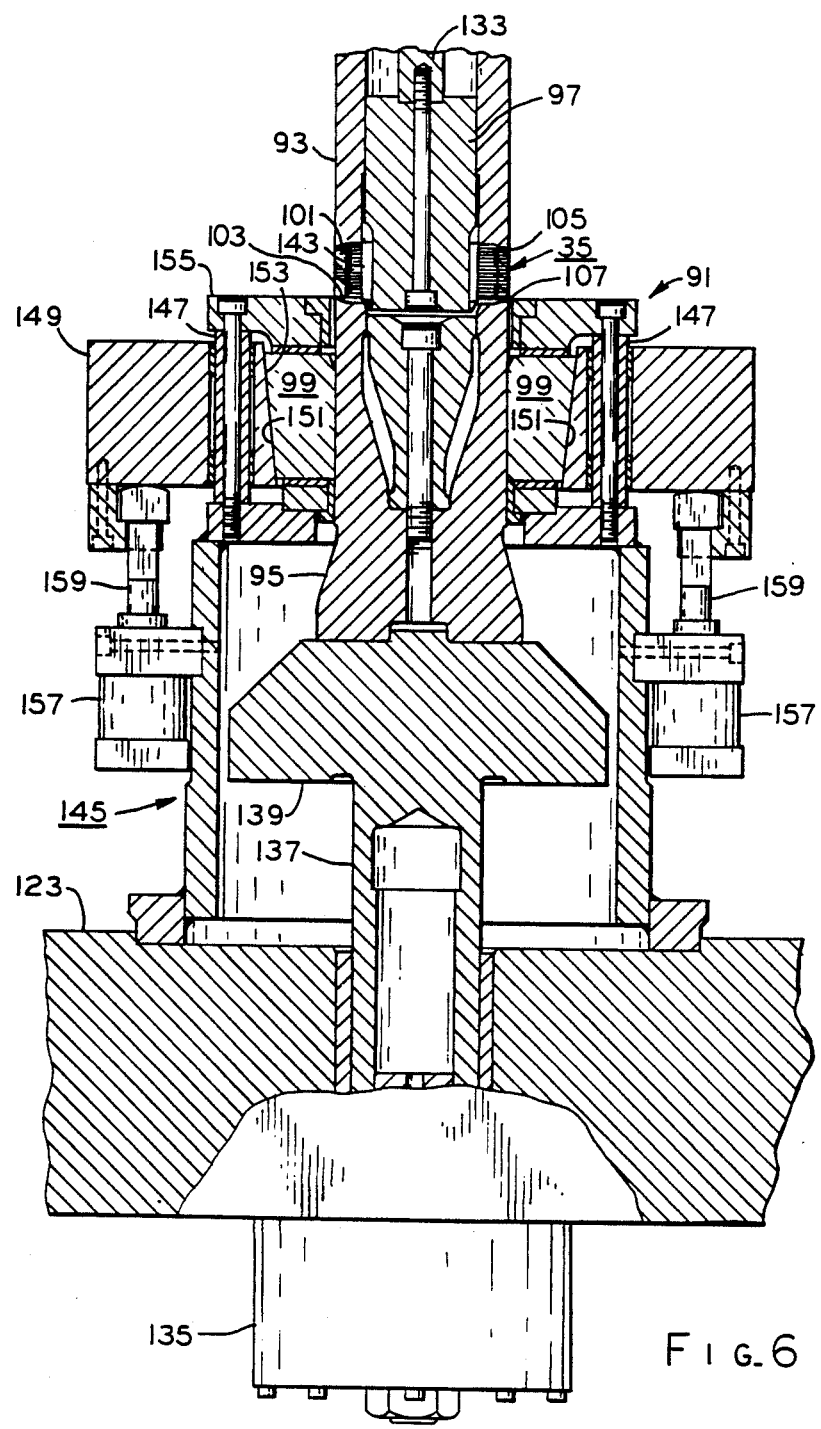
Figure 7:
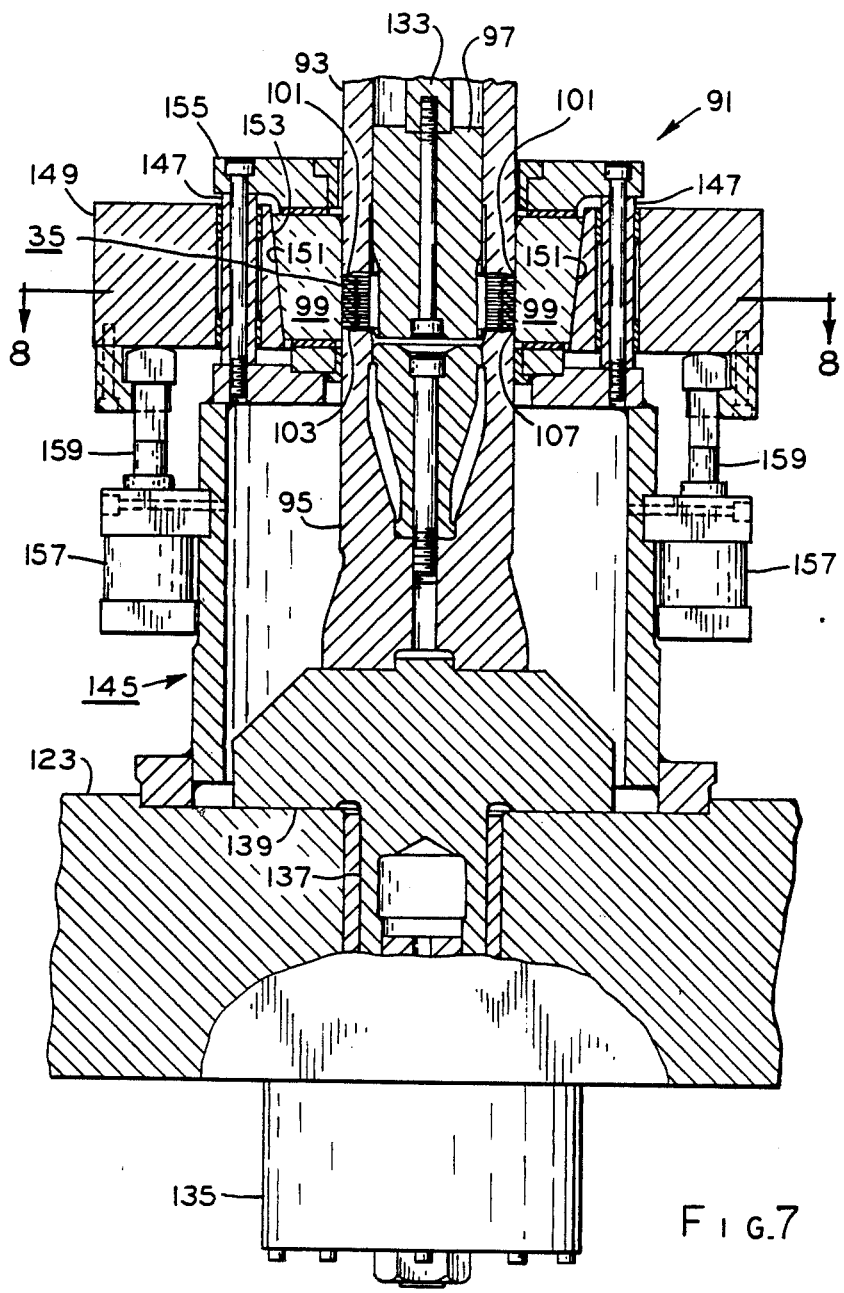

Sizing arbor 97 has the configuration of a generally elongate cylindric rod having a diameter preselected to define the predetermined size or diameter for inner circumferential surface 31 of stack 75. Therefore, at least upon the above discussed containment of stack 75 in its preselected located position between dies 93, 95, arbor 97 is moved into association with the stack, and thereby the arbor is positioned generally in predetermined spaced apart relation, i.e., a predetermined radial distance D, from tooth tip rows 41 of the stack, respectively, as best seen in FIGS. 6 and 9. Thereafter, arbor 97 and opposed dies 93, 95 with stack 75 contained therebetween are conjointly moved toward a position seating die 95 against further movement, and during such conjoint movement, the containment of the stack in its preselected located position between the dies and also the predetermined spaced apart relation of the arbor with tooth tip rows 41 of the stack are maintained, respectively, as best seen in FIGS. 7 and 9.

Figure 5:
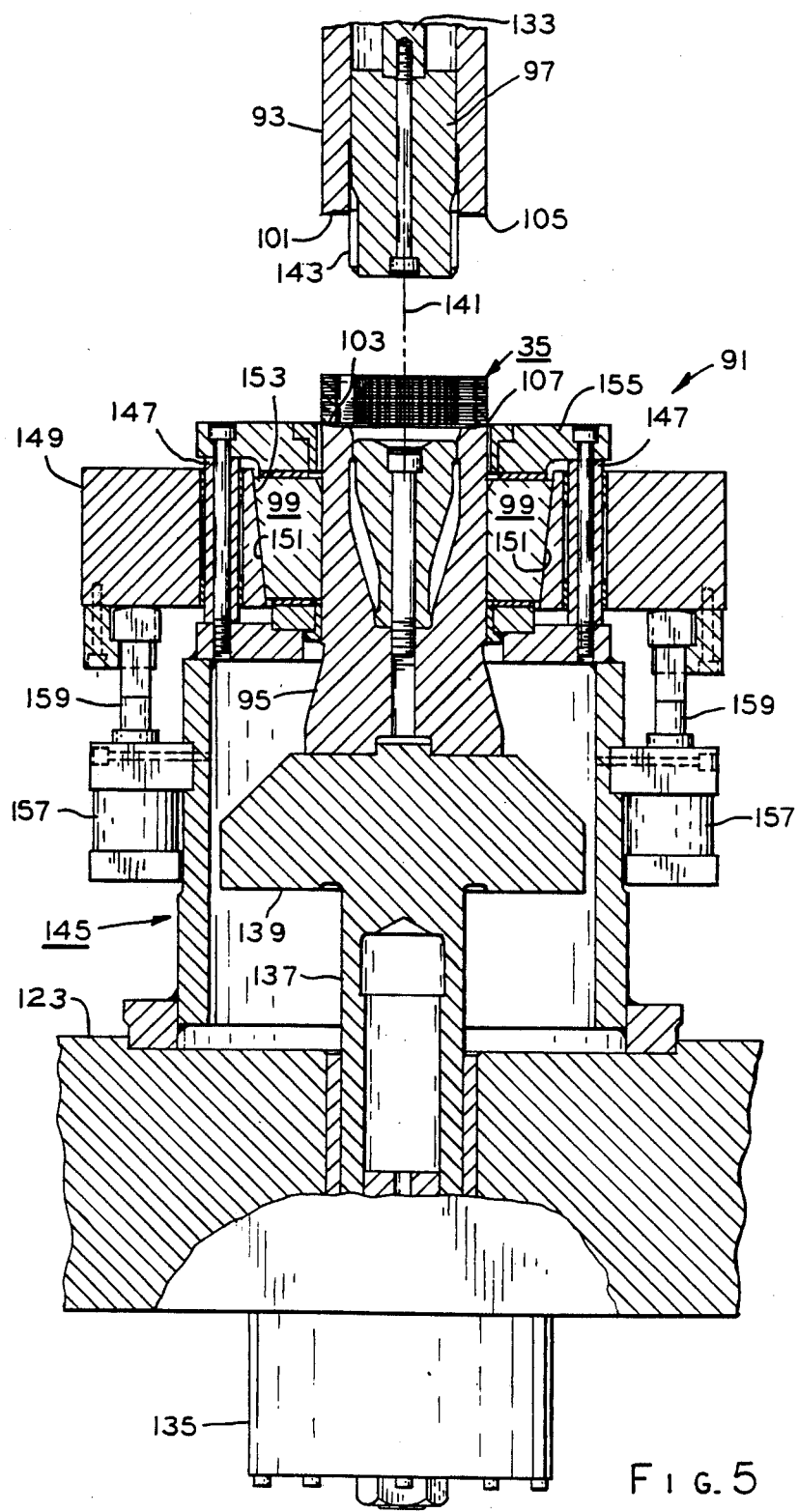
FIGS. 5, 6 and 7 are enlarged partial sectional views of the apparatus of FIG. 3 illustrating various positions of a pair of opposed die means and a plurality of sizing means of the apparatus for sizing the core, respectively.
Figure 8:
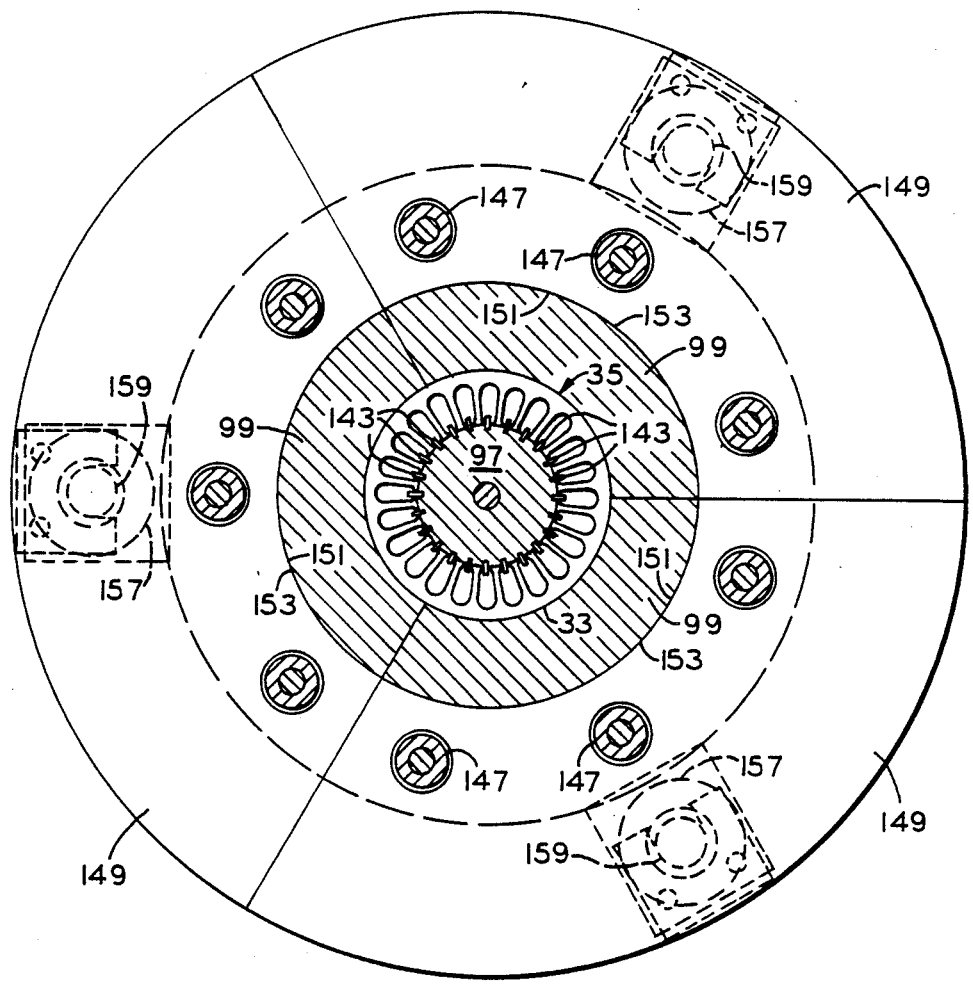
FIG. 8 is a sectional view taken along line 8—8 in FIG. 7.
Figure 13:
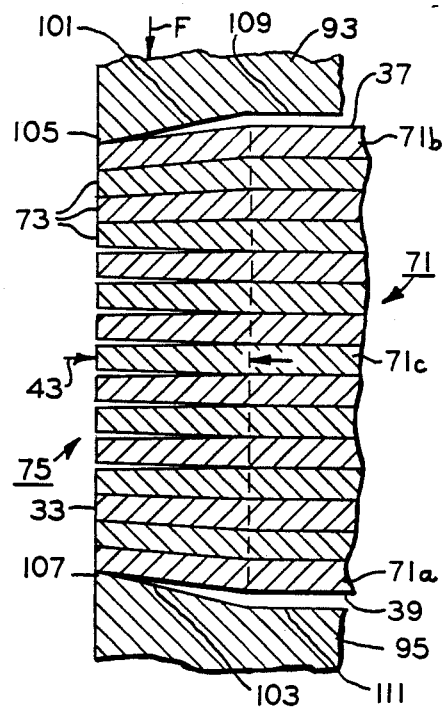
Figure 14:
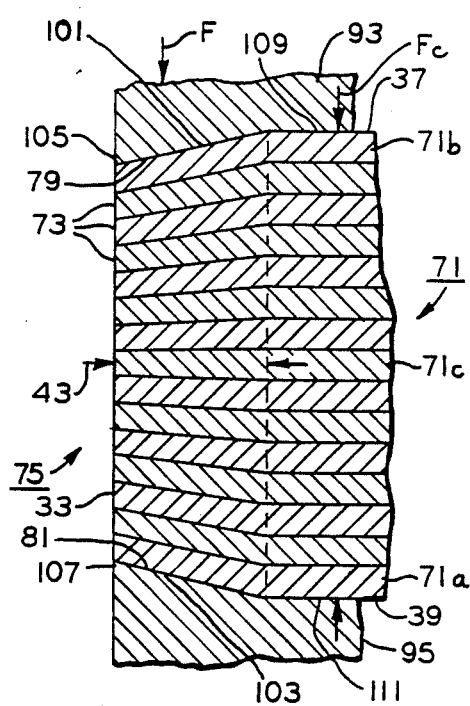
Figure 15:
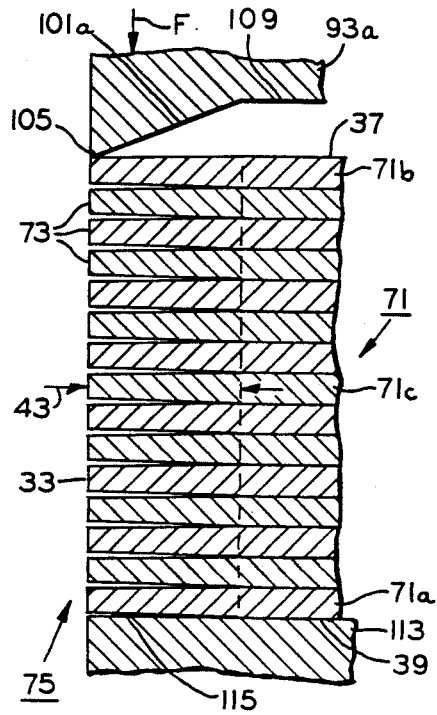
FIGS. 15, 16, 17 and 18 are generally the same as FIGS. 11–14 showing the formation of an alternative core in one form of the invention and illustrating principles which may be practiced in an alternative method of sizing a core.
Figure 16:
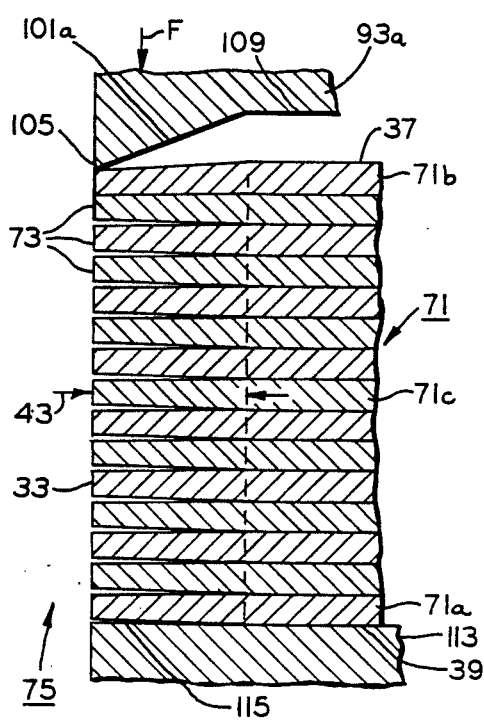
Figure 17:
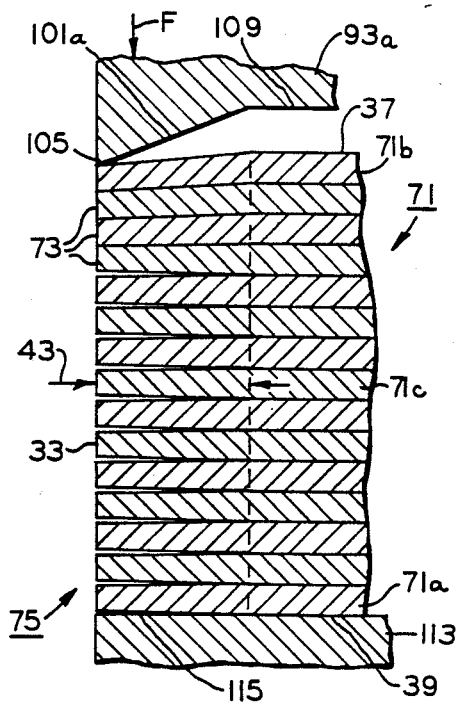
Figure 18:
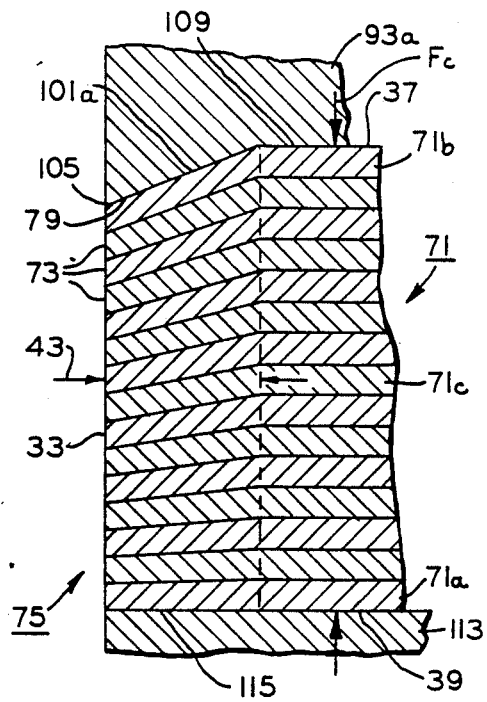

Sizing jaws 99 are movable between open positions, as best seen in FIG. 5 and closed mating positions thereof, as best seen in FIGS. 7-10, respectively. Upon the above discussed conjoint movement of opposed dies 93, 95 and arbor 97 to dispose die 95 in its seated position, jaws 99 are moved or actuated from the open positions toward the closed mating positions thereof, and when in the closed mating positions, the jaws are arranged in predetermined spaced apart relation, i.e., a predetermined radial distance R, from outer circumferential surface 33 of stack 77 maintained in its preselected located position between dies 93, 95, as best seen in FIGS. 8 and 9. It may be noted that jaws 99 in the closed mating positions thereof, are concentrically arranged with arbor 97 and have a diameter preselected to define the predetermined size or diameter of outer circumferential surface 33 of stack 75. With jaws 99 in their closed mating positions so as to be predeterminately radially spaced apart from outer circumferential surface 33 of stack 77 in its preselected located position between dies 93, 95, force F is exerted on die 93 thereby to move it relative to arbor 97, jaws 99 and die 95 in its seated position. In response to this force imparted to effect the relative movement of die 93, it may be noted that only beveled die surfaces 101, 103 on dies 93, 95 become engaged with only tapered parts 73 on leading and trailing helical convolutions 71a, 71b in stack 75, and the tapered parts on at least some of helical convolutions 71 are successively deformed generally axially across the stack with such successive deformation progressing from the tapered parts on the leading and trailing helical convolutions generally axially inwardly of the stack, as previously mentioned. In response to this deformation, it may also be noted that axially adjacent ones of tapered parts 73 on axially adjacent ones of helical convolutions 71 in stack 75 are abutted together in engagement with each other generally axially across the stack, and upon the abutment of the axially adjacent tapered parts, force F acting on die 93 then compresses only the abutted together tapered parts generally axially across the stack only between beveled die surfaces 101, 103 on dies 93, 95 in the manner discussed hereinabove. It may be noted that only beveled dies surfaces 101, 103 on dies 93, 95 engage only tapered parts 73 on leading and trailing helical convolutions 71a, 71b in stack 75 thereby to effect the compression of only circumferential section 43 of the stack. Upon the compression of only circumferential section 43 of stack 75 between beveled die surfaces 101, 103 on dies 93, 95, respectively, it may be noted that generally opposite central surfaces 109, 111 of dies 93, 95 become engaged with opposite end faces 37, 39 of the stack at least generally across tooth rows 77 thereof to effect the exertion of containment force Fc on the tooth rows in the manner discussed hereinabove. Therefore, tooth rows 77 are subjected only to containment force Fc applied by dies 93, 95 thereby to obviate the possibility of angularly displacing teeth 59 from the preselected pitch axes 61 in the tooth rows thereof in the stack, respectively, as previously mentioned.

In response to the compression of only circumferential section 43 generally axially across stack 75 between only beveled die surfaces 101, 103 of dies 93, 95, outer circumferential surface 33 of the stack is expanded or displaced generally radially outwardly thereof into sizing engagement with jaws 99 in their closed mating positions thereby to effect the predetermined sizing of the entire outer circumferential surface, and tooth tip rows 41 of the stack are expanded or displaced generally radially inwardly thereof into sizing engagement with arbor 97 thereby to effect the predetermined sizing of inner circumferential surface 31 of the stack, respectively. As previously discussed, the plastic flow of the ferromagnetic material in only yoke 57 of helical convolutions 71 in stack 75 in response to the exertion thereon of force F effects the radial movement of outer circumferential surface 33 and tooth tip rows 41 of the stack, and it is believed that the radial inward movement of the tooth tip rows into sizing engagement with arbor 97 occurs subsequent to the radially outward movement of the outer circumferential surface into sizing engagement with jaws 99. Albeit not shown for the purposes of drawing simplification and brevity of disclosure, it is contemplated that apparatus 91 may be operated generally in the same manner discussed above to effect the predetermined sizing of the inner and outer circumferential surfaces of a stack of individual laminations arranged generally in surface-to-surface engagement within the scope of the invention so as to meet at least some of the objects thereof. To complete the discussion of the operating method for apparatus 91, it may be noted that the aforementioned "spring-back" of helical convolutions 71 effected upon the edgewise winding of strip 45 may be compensated for by the radial displacement of inner and outer circumferential surfaces 31, 33 into sizing engagement with arbor 97 and jaws 99, respectively, as discussed above. As previously mentioned, when the aforementioned plastic flow of the ferromagnetic material in only yoke 57 of helical convolutions 71 in stack 75 occurs, the yield point of such material is exceeded thereby to establish a new stress/strain relationship in the stack, and for all practical purposes, the plastic flow eliminates "spring-back" in the stack.

An alternative method of operating apparatus 91 is illustrated in FIGS. 15-18 with the alternative method having generally the same method steps and utilizing generally the same component parts of the apparatus as discussed hereinabove with respect to the previously described operating method for the apparatus.

In the practice of this alternative operating method for apparatus 91, other dies 93a, 113 are utilized in the place of dies 93, 95. It may be noted that die 113 is provided with a generally planar die surface 115, and beveled die surface 101a of die 93a has a greater angle than the die surface 101 of die 93. Thus, when stack 75 is placed in its preselected position on die 113, planar die surface 115 thereof seats or is engaged with leading helical convolution 71a in the stack with the exception of tapered part 73 on the leading helical convolution. When force F is exerted on die 93a with stack 75 contained in its preselected located position between dies 93a, 113, the engagement of only beveled die surface 101a on die 93a with only tapered part 73 on trailing helical convolution 71b in the stack effects the successive deformation of only the tapered parts in the helical convolutions generally axially across the stack with such successive deformation progressing from the tapered part of the trailing helical convolution toward the tapered part of leading helical convolution 71a. Thus, it may be noted that axially adjacent ones of tapered parts 73 on helical convolutions 73 in stack 75 are successively deformed so as to abut in engagement with each other, and upon the deformation of the tapered part on leading helical convolution 71a, the entire leading helical convolution becomes seated on or engaged with planar die surface 115 of die 113. Thereafter, force F acting on die 93a serves to compress only circumferential section 43 of stack 75 generally axially across the stack between beveled die surface 101a and planar die surface 115 thereby to effect the radial displacement of inner and outer circumferential surfaces 31, 33 of the stack into the sizing engagement thereof with arbor 97 and jaws 99, respectively, as previously discussed.

With reference once again to the drawings in general and recapitulating at least in part with respect to the foregoing, apparatus 91 is provided for predeterminately sizing inner and outer circumferential surfaces of core 35 having opposite end faces 37, 39 respectively interposed between the inner and outer circumferential surfaces and with tooth tip rows 41 on the core comprising the inner circumferential surface thereof (FIGS. 1-19). Apparatus 91 has dies 93, 95 arranged generally in opposed relation and operable generally for compressing only circumferential section 43 of core 35, and a plurality of sizing means, i.e., sizing arbor 97 and jaws 99, are operable generally for disposition in confronting and predetermined radially spaced apart relation with outer circumferential surface 33 and tooth tip rows 41 of the core, respectively (FIGS. 5-10). Outer circumferential surface 33 and tooth tip rows 41 of core 35 are displaced generally radially thereof into sizing engagement with arbor and jaws 97, 99 thereby to effect the predetermined sizing of inner and outer circumferential surfaces 31, 33 of the core in response to the compression of only circumferential section 43 of the core by dies 93, 95, respectively (FIGS. 11-14).

Figure 3:
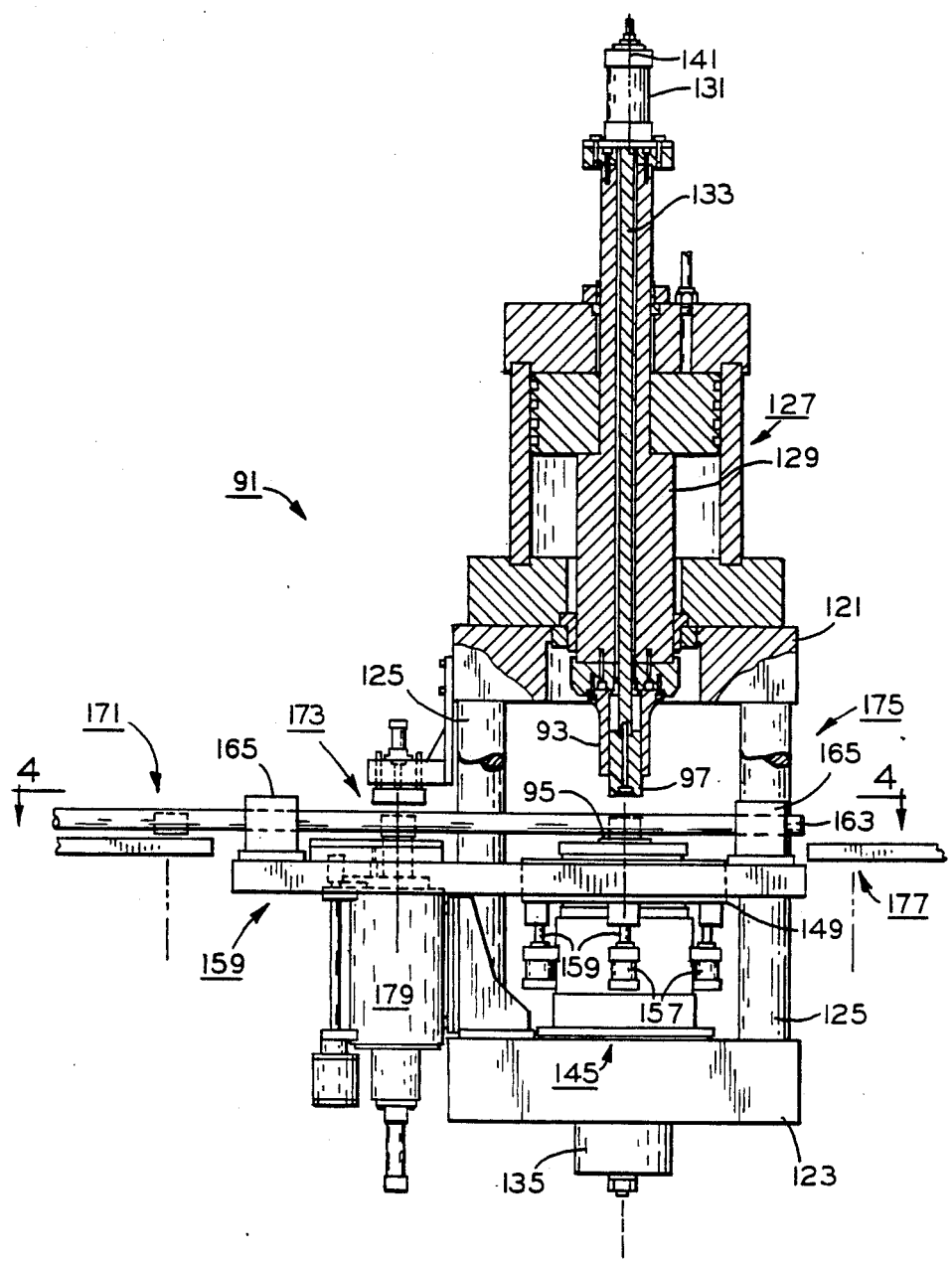
FIG. 3 is a partial front elevational view showing partially in cross-section apparatus for sizing a core and illustrating principles which may be practiced in a method of operating the apparatus.

More particularly and with specific reference to FIGS. 3-14 and 19, apparatus 91 is provided with upper and lower plates 121, 123 suitably interconnected by a plurality of dowels or dowel pins 125. Actuating means, such as for instance a servo motor 127 or the like which may be of the double-acting air or hydraulic motor type, is mounted by suitable means to upper plate 121, and servo motor 127 includes a reciprocally movable drive or piston rod 129 which extends generally coaxially through the servo motor, as best seen in FIG. 3. Another actuating means, such as for instance another servo motor 131 or the like which may be of the double-acting air or hydraulic motor type, is secured by suitable means to an upper end of piston rod 129 for conjoint movement therewith, and servo motor 131 includes another reciprocally movable drive or piston rod 133 which extends generally coaxially through piston rod 129. Die 93 is connected by suitable means to the lower end of piston rod 129, so as to be conjointly movable therewith, and arbor 97 which extends generally concentrically through die 93 and its beveled die surface 101 is connected by suitable means to the lower end of piston rod 133 so as to be conjointly movable therewith. Another actuating means, such as for instance a servo motor 135 or the like which may be of the double-acting air or hydraulic motor type, is mounted by suitable means to lower plate 123, and servo motor 135 includes another reciprocally movable drive or piston rod 137 which extends through the lower plate. Die 95 is secured by suitable means to the upper end of piston rod 137 for conjoint movement therewith, and the piston rod includes an abutment means 139 for seating or abutting engagement with lower plate 123, as discussed hereinafter. Piston rods 129, 133, 137 are reciprocally movable on a centerline axis 141 of apparatus 91, and both dies 93, 95 and arbor 97 on the piston rods are generally concentrically arranged about centerline axis 141, respectively. If desired, arbor 97 may be provided with a plurality of means, such as for instance flutes 143 or the like, for locating or guiding relation between adjacent ones of tooth tip rows 41 on core 35, as discussed in greater detail hereinafter, and the flutes extend generally radially outwardly from the arbor, respectively, as best seen in FIGS. 5 and 8-10.

Sizing jaws 99 are also concentrically aligned about centerline axis 141 of apparatus 91, and the jaws are generally reciprocally and radially movable between the open positions and the closed mating positions on a support or support means 145 therefor, as best seen in FIGS. 5-8. Support 145 is secured by suitable means to lower plate 123 so as to extend at least in part generally coaxially about lower die 95 and its piston rod 137, and a plurality of guide means or guide rods 147 are secured to the support generally radially outwardly of sizing jaws 99. Means, such as a plurality of sector cams 149 or the like for instance, are operable generally for camming jaws 99 to effect the movement of the jaws from the open positions toward the closed mating positions thereof, as best seen in FIGS. 5-8. Jaws 99 and cams or camming means 149, respectively include a plurality of mating cam surfaces 151, 153, and the cams are reciprocally and guidably movable on guide rods 147 therefor while the jaws are in part guidably interposed for movement between a plurality of guide plates or guide means 155 therefor which are secured to the guide rods. A plurality of cam actuating means, such as for instance cam operating servo motors 157 which may be the double-acting air or hydraulic motor type, are secured by suitable means to support 145, and the cam operating servo motors include a plurality of reciprocally movable drive or piston rods 159 which are secured by suitable means to cams 149, respectively.

In the operation of apparatus 91 assume that core 35 is placed in its preselected located position on die 95 in an at-rest position thereof, as previously discussed, and that die 93 and arbor 97 are in retracted positions thereof, as b st seen in FIGS. 3 and 5. To initiate the operation of apparatus 91, servo motor 127 is actuated to drive its piston rod 129 and move die 93 from its retracted position toward a protracted position in engagement with core 35, as best seen in FIG. 6, thereby to contain the core in the preselected located position thereof between dies 93, 95, respectively. With core 35 so contained between dies 93, 95, servo motor 131 is then actuated to drive its piston rod 133 and move arbor 97 from the retracted position toward a protracted position thereof, as best seen in FIG. 6; and, in its protracted position, the arbor is arranged in the previously mentioned predeterminately radially spaced apart relation with tooth tip rows 41 of the core, and flutes 143 on the arbor are interposed between adjacent ones of the tooth tip rows, as best seen in FIG. 9. Thereafter, servo motors 127, 131, 135 are conjointly actuated to drive their piston rods 129, 133, 137 and effect the movement of die 95 from the at-rest position toward a seated position thereof with abutment 139 on piston rod 137 being seated in engagement with lower plate 123, as best seen in FIG. 7, and also to effect conjoint movement with die 95 of both die 93 and arbor 97 toward second protracted positions thereof. Of course, during this conjoint movement of dies 93, 95 and arbor 97, core 35 is maintained in its preselected located position between the dies, and the predetermined radially spaced apart relation is maintained between tooth tips rows 41 of the core and the arbor. Thus, in response to the conjoint movement of die 95 to its seated position and die 93 and arbor 97 to the second protracted positions thereof, outer circumferential surface 33 of core 35 is disposed within sizing jaws 99 in the open positions thereof, as best seen in FIGS. 7 and 9. With core 35 so disposed within sizing jaws 99 in the open positions thereof, cam operating servo motors 157 may be conjointly actuated to drive their piston rods 159 and move cams 149 upwardly on guide rods 147 therefor. This upward movement of cams 149 on guide rods 147 drivingly engages cam surfaces 153 on the cams with cam surfaces 151 on sizing jaws 99 thereby to cam the sizing jaws at least generally radially from the open positions toward the closed mating positions thereof in the previously mentioned predetermined radially spaced relation with outer circumferential surface 33 on core 35, as best seen in FIGS. 8 and 9. When sizing jaws 99 are in the closed mating positions thereof, servo motor 127 is effective to exert force F on die 93 to effect the compression of only circumferential section 43 of core 35 between dies 93, 95 and the resulting displacement of inner and outer circumferential surfaces 31, 33 into sizing engagement with arbor 97 and jaws 99, respectively, as discussed in detail hereinabove and as best seen in FIGS. 10-14.

Figure 4:
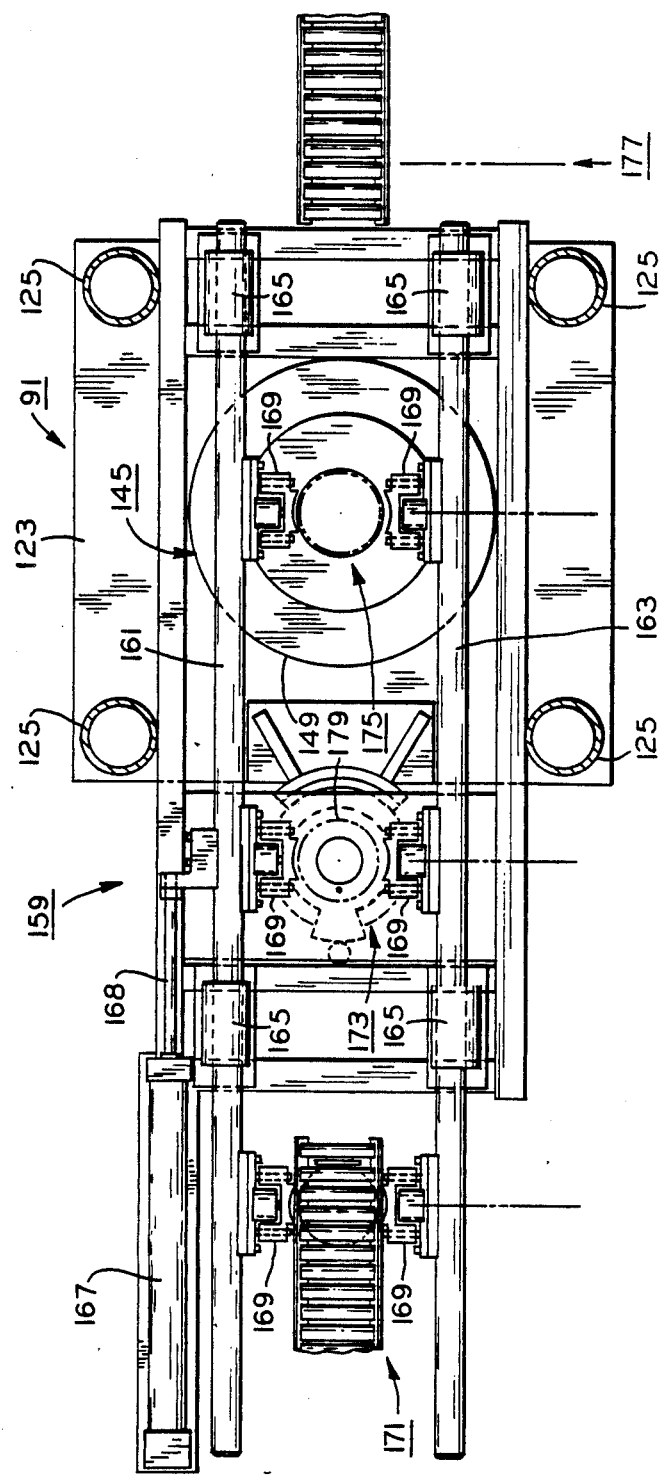
FIG. 4 is a sectional view taken along line 4—4 in FIG. 3.

Albeit not a part of this invention, a core transfer mechanism 159 is mounted by suitable means to apparatus 91, as best seen in FIGS. 3 and 4, and such core transfer mechanism is of a type well known to the art being commercially available from Grotnes Metalforming Systems, Inc., Chicago, Ill. Core transfer mechanism 159 has a pair of spaced interconnected slide rods 161, 163 journaled at 165 for conjoint reciprocal movement, respectively, and another double-acting servo motor 167 has a piston rod 168 secured to slide rod 161 so as to reciprocally drive the slide rods 161, 163. Three sets of opposed core gripping devices 169 of a type well known to the art are spaced apart along slide rods 161, 163 and are conjointly operable to successively deliver cores 35 from a receiving station 171 therefor to a core aligning station 173, a work station 175 at apparatus 91, and an unloading station comprising a conveyor at 177 when slide rods 161, 163 are reciprocally driven upon the selective actuation of servo motor 167. An aligning device 179 is mounted by suitable means to lower plate 123 of apparatus 91 so as to be located at core aligning station 173, and such aligning device is of a type well known to the art being commercially available from Grotnes Metalforming Systems, Inc., Chicago, Ill. When a core 35 in the aforementioned as wound condition thereof is delivered to core aligning station 173 by the operation of core transfer mechanism 159, aligning device 179 is operable to adjust or reposition the helical convolutions in the core thereby to effect the alignment of the component parts of the helical convolutions generally axially across the core between the opposite end faces thereof, as previously mentioned.

From the foregoing, it is now apparent that an improved core 35 operating such apparatus have been presented meeting the objects set out hereinbefore, as well as others, and it is contemplated that changes as to the precise arrangements, shapes, details and connections of the components associated with such core may be made by those having ordinary skill in the art without departing from the spirit of the invention or from the scope of the invention as set out in the claims which follow.

What I claim as new and desire to secure by Letters Patent of the United States is:

1. An edgewise wound core comprising:
   a lanced strip of generally thin ferromagnetic material having a pair of generally opposite edges and edgewise wound into a plurality of helical convolutions arranged in a generally annular stack thereof, respectively;
   a leading helical convolution and a trailing helical convolution on said stack defining a pair of opposite end faces thereof, respectively;
   an inner circumferential surface and an outer circumferential surface on said stack extending generally axially between said opposite end faces thereof and defined at least in part by said opposite edges on said helical convolutions in said stack, respectively;
   a yoke on said helical convolutions and extending generally circumferentially about said stack between said opposite end faces thereof, said yoke including a tapered part on each of said helical convolutions at least generally adjacent one of said opposite edges thereof and having a thickness less than that of the helical convolutions between said tapered part and the other of said opposite edges on said helical convolutions, and said tapered part on axially adjacent ones of said helical convolutions in said stack being engaged with each other thereby to comprise said outer circumferential surface of said stack, respectively;
   a generally annular beveled surface on at least one of said opposite end faces of said stack at least generally adjacent said outer circumferential surface thereof, said beveled surface comprising said tapered part on at least one of said leading and trailing helical convolutions in said stack;
   a plurality of teeth on said helical convolutions extending on preselected pitch axes therefor generally radially inwardly from said yoke and arranged in a plurality of tooth rows extending generally axially between said opposite end faces of said stack, said teeth including a plurality of tips at least generally adjacent said other opposite edge on said helical convolutions and arranged in a plurality of tooth tip rows generally axially between said opposite end faces of said stack thereby to comprise said inner circumferential surface of said stack, respectively; and
   a plurality of winding receiving slots in said helical convolutions between said yoke and adjacent ones of said teeth thereof and intersecting with said other opposite edge on said helical convolutions between said tooth tips, said slots being arranged in a plurality of slot rows extending generally axially of said stack and intersecting with said opposite end faces and said inner circumferential surface between said tooth tip rows, respectively.

2. The edgewise wound core as set forth in claim 1 further comprising another generally annular beveled surface on said other opposite end face of said stack at least generally adjacent said outer circumferential surface thereof, said another beveled surface comprising said tapered part on the other of said leading and trailing helical convolutions in said stack.

3. An edgewise wound core comprising:
   a lanced strip of generally thin ferromagnetic material having a pair of generally opposite edges and edgewise wound into a plurality of helical convolutions arranged in a generally annular stack thereof, said stack including a pair of generally opposite end faces, one of said opposite edges on said helical convolutions comprising at least in part an inner circumferential surface on said stack interposed between said opposite end faces, a tapered part continuously deformed at least adjacent the other of said opposite edges on said helical convolutions in response to the edgewise winding thereof, said tapered part having a thickness generally less than that of said helical convolutions between said tapered part and said one opposite edge, and at least some of said tapered parts on respective adjacent ones of said helical convolutions being deformed generally axially in said stack between said opposite end faces so as to at least in part abut together said tapered parts thereby to define an outer circumferential surface about said stack between said opposite end faces, respectively.

4. The edgewise wound core as set forth in claim 3 further comprising a generally annular beveled surface on at least one of said opposite end faces of said stack at least generally adjacent said outer circumferential surface thereof, said annual beveled surface comprising said tapered part on at least an end one of said helical convolutions in said stack.

5. The edgewise wound core as set forth in claim 3 further comprising a pair of generally annular beveled surfaces on said opposite end faces of said stack at least generally adjacent said outer circumferential surfaces thereof, said beveled surfaces comprising said tapered parts on opposite end ones of said helical convolutions in said stack, respectively.

6. The edgewise wound core as set forth in claim 3 wherein said lanced strip further has a plurality of teeth terminating at least adjacent said one opposite edge and spanning a plurality of preselected pitch axes, said teeth being arranged in a plurality of tooth rows spanning the preselected pitch axes and extending generally axially across said stack between said opposite end faces so as to in part comprise said inner circumferential surface, respectively.

7. The edgewise wound core as set forth in claim 3 wherein the lanced strip further has a plurality of spaced apart winding receiving slots intersecting said one opposite edge, said slots being arranged in a plurality of slot rows extending generally axially across said stack and intersecting said opposite end faces, respectively.

8. The edgewise wound strip as set forth in claim 3 wherein said abutted together tapered parts also define a generally annular circumferential section axially deformed in said stack between said opposite end faces, said out circumferential surface extending about said annular circumferential section.

9. The edgewise wound core as set forth in claim 8 wherein said stack includes a leading one and a trailing one of said helical convolutions defining a pair of generally opposite end faces on said stack, said tapered part on at least one of said leading and trailing ones of said helical convolutions comprising a generally annular beveled surface on said annular circumferential section.

10. The edgewise wound core as set forth in claim 8 wherein said stack includes a leading one and a trailing one of said helical convolutions defining a pair of generally opposite end faces on said stack, said tapered parts on said leading and trailing ones of said helical convolutions comprising a pair of generally opposite annular beveled surfaces on said annular circumferential section.

11. An edgewise wound core comprising:
a lanced strip of generally thin ferromagnetic material having a pair of generally opposite edges and edgewise wound into a plurality of helical convolutions arranged in a generally annular and axially extending stack thereof, said stack including a pair of opposite end faces defined by leading and trailing ones of said helical convolutions, a tapered section at least generally adjacent one of said opposite edges on each of said helical convolutions in said stack, said tapered sections on at least some of said helical convolutions being deformed generally axially across said stack between said opposite end faces thereof so as to at least in part abut together said tapered sections on axially adjacent ones of said helical convolutions in said stack, and said abutted together tapered sections comprising an outer circumferential surface on said stack interposed between said opposite end faces thereof, respectively.

12. The edgewise wound core as set forth in claim 11 wherein the other of said opposite edges on said helical convolutions includes a plurality of spaced apart tooth tips arranged to extend in a plurality of rows thereof generally axially between said opposite end faces of the stack thereby to define an inner circumferential surface thereof, respectively.

13. The edgewise wound core as set forth in claim 11 further comprising a generally annular beveled surface on at least one of said opposite end faces of the stack at least generally adjacent said outer circumferential surface thereof, said annular beveled surface comprising said deformed tapered section on at least one of said leading and trailing ones of said helical convolutions.

14. The edgewise wound core as set forth in claim 11 wherein said lanced strip further has a plurality of teeth terminating at least adjacent the other of said opposite edges and spanning a plurality of preselected pitch axes, said teeth being arranged in a plurality of tooth rows extending generally axially across said stack between said opposite end faces, respectively.

15. The edgewise wound core as set forth in claim 14 further comprising a bore extending generally axially across said stack and intersecting said opposite end faces, said bore being defined in part by said tip rows.

16. The edgewise wound core as set forth in claim 11 wherein said lanced strip further has a plurality of winding receiving slots intersecting the other of said opposite edges, said slots being arranged in a plurality of slot openings extending generally axially across said stack and intersecting said opposite end faces, respectively.

17. The edgewise wound core as set forth in claim 11 wherein said abutted together tapered sections further comprise a generally annular circumferential section in said stack between said opposite end faces, said outer circumferential surface extending about said annular circumferential section.

18. A core for a dynamoelectric machine comprising:
a stack of generally thin ferromagnetic material, said stack including a pair of generally opposite end faces, a pair of generally radially spaced apart circumferential surfaces on said stack and interposed between said opposite end faces thereof, and a generally annular circumferential section axially deformed in said stack between said opposite end faces at least generally adjacent one of said circumferential surfaces and defining a generally annular beveled surface on at least one of said opposite end faces of said stack.

19. The core as set forth in claim 18 further comprising a lanced strip of the generally thin ferromagnetic material having a pair of generally opposite edges and edgewise wound into a plurality of helical convolutions arranged in said stack, said opposite edges respectfully defining at least in part said circumferential surfaces, and leading and trailing ones of said helical convolutions respectively defining said opposite end faces.

20. The core as set forth in claim 19 wherein said annular circumferential section includes a continuous tapered part on said helical convolution at least adjacent one of said opposite edges, at least some of said tapered parts respectively on adjacent ones of said helical convolutions being deformed generally axially across said stack thereby to engage adjacent ones of said tapered parts and form said one circumferential surface with said beveled surface being defined by one of said tapered parts on at least one of said leading and trailing helical convolutions.

21. The core as set forth in claim 18 wherein said stack further includes a plurality of rows of teeth extending between said opposite end faces and spanning a plurality of preselected pitch axes, and said tooth rows defining in part the other of said circumferential surfaces, respectively.

22. The core as set forth in claim 18 herein said stack further includes a plurality of winding receiving slots intersecting said opposite end faces and the other of said circumferential surfaces, respectively.

23. An edgewise wound core comprising:

a lanced strip of generally thin ferromagnetic material having a pair of generally opposite edges and edgewise wound into a plurality of helical convolutions arranged in a stack thereof, an uninterrupted tapered part continuously formed on said helical convolutions at least adjacent an outer circumferential one of said opposite edges in response to the edgewise winding of said lanced strip and said tapered parts on adjacent ones of said helical convolutions being compressed into engagement generally axially across said stack thereby to define a generally annular circumferential section having an axial length across said stack predeterminately less than the axial length of said stack at least generally at an inner circumferential one of said opposite edges.

24. The edgewise wound core as set forth in claim 23 wherein said tapered part has a thickness less than that of the helical convolutions between said tapered part and an inner circumferential one of said opposite edges.

25. The edgewise wound core as set forth in claim 23 wherein said lanced strip includes a plurality of teeth terminating at least adjacent said inner circumferential one of said opposite edges and spanning a plurality of preselected pitch axes, said teeth being arranged in a plurality of tooth rows spanning the preselected pitch axes and extending generally axially across said stack, respectively.

26. The edgewise wound core as set forth in claim 25 wherein said tooth rows define at least in part a bore extending generally axially across said stack.

* * * * *